Sept. 18, 1951  D. L. WISE ET AL  2,568,311
SAFETY DEVICE FOR HYDRAULIC BRAKES
Filed April 10, 1950
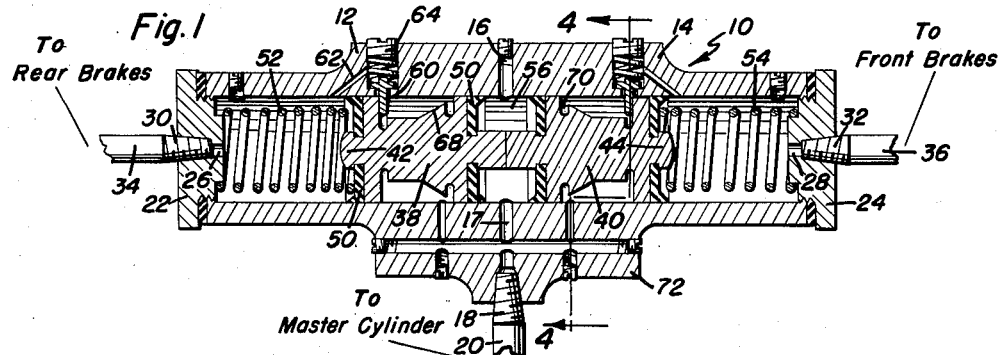
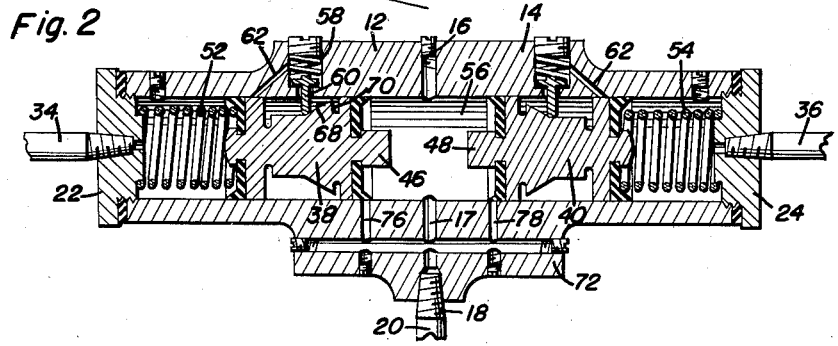
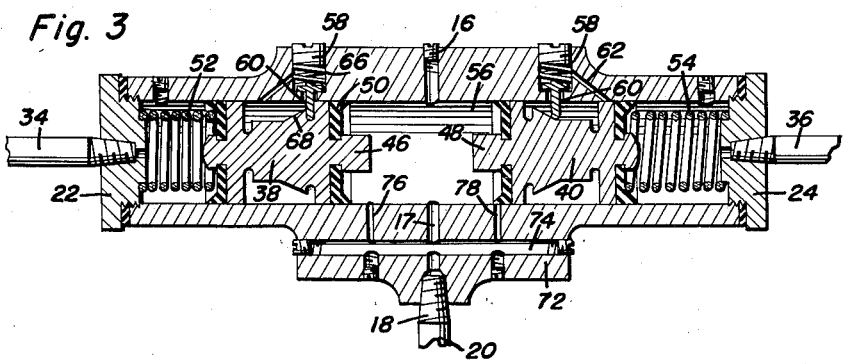
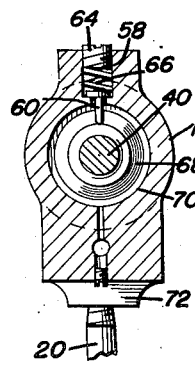
David L. Wise
Arthur R. King
INVENTORS
BY *Clarence A. O'Brien*
*and Harvey B. Jacobson*
Attorney Patented Sept. 18, 1951

2,568,311

UNITED STATES PATENT OFFICE 2,568,311

SAFETY DEVICE FOR HYDRAULIC BRAKES

David L. Wise, Watsonville, and Arthur R. King, Salinas, Calif.

Application April 10, 1950, Serial No. 155,084

2 Claims. (Cl. 60—54.5)

1

This invention relates to a safety coupling for use in a hydraulic brake system the primary object of which is to eliminate the hazard of brake failure due to the fluid escaping through a broken brake line or leak therein.

Although the present invention may be applied to any hydraulic system operating on a fixed volume principle, it is primarily designed to replace the T-connection between the line from the master cylinder to the lines leading to the front and rear wheel cylinders in a conventional automotive vehicle. The invention does not interfere with the normal operation of the brakes but functions to automatically lock off the leaky brake line and allow the other brake lines and cylinders to operate normally and permit proper braking action.

A further object of the invention is to provide in an automotive vehicle having a hydraulic brake system including a master cylinder and lines leading to the front and rear wheel brakes; a safety coupling connecting said master cylinder to said lines including a cylinder, apertured closures at the ends of said cylinder and secured to the front and rear wheel brake lines, means connecting the master cylinder centrally to said cylinder for communication with the interior of the latter, opposed pistons axially slidable in said cylinder, resilient means within said cylinder between said pistons and said closures normally urging said pistons towards each other, and means for locking each of said pistons in a position within said cylinder to prevent further delivery of hydraulic fluid to said brake lines when a leak occurs in said lines.

These, together with various ancillary objects and features of the invention which will later become apparent as the following description proceeds, are attained by the device, a preferred embodiment of which has been illustrated by way of example only in the accompanying drawing, wherein:

Figure 1 is a longitudinal sectional view through the device illustrating the position of the parts before the brakes are applied;

Figure 2 is a similar view illustrating the position of the parts when the brakes are applied;

Figure 3 is a similar view illustrating the position of the parts when the brakes are applied and a leak is present in one of the brake lines; and, Figure 4 is a sectional view taken on the line 4—4 of Figure 1.

Specific reference is now made to the drawing. In the several views in the accompanying

2 drawing and in the following specification reference characters indicate corresponding elements throughout.

The present device is in the form of a cylinder 10 consisting of two equal halves 12 and 14 secured together. At one point of the juncture of the halves is provided a tapped bore and closure screw 16 received therein while at another point is provided another bore 17 receiving the threaded tapered end 18 of a line 20 leading to a master cylinder (not shown). The cylinder 10 is hollow and includes closures 22 and 24 threaded on the ends thereof, the closures including bores 26 and 28 in which are threaded the tapered ends 30 and 32 of the lines 34 and 36 leading to the rear and front brakes or wheel cylinders (not shown).

Axially slidable in the cylinder is a pair of opposed pistons 38 and 40 having reduced outer terminal portions 42 and 44 and reduced inner terminal portions 46 and 48, the pistons being provided with appropriate rubber cups 50. Interposed between the pistons and the closures 22 and 24 are coil springs 52 and 54 which normally urge the pistons towards each other and in the central portion 56 of the cylinder which is communicative with the master cylinder through the bore 17 and line 20.

In each half 12 and 14 of the cylinder is provided a bore 58 in which is slidably positioned a plunger 60, the bore being communicative with the interior of the cylinder via a conduit 62. The bore includes a threaded nut 64 and interposed between the nut and a shoulder on the plunger is a coil spring 66 normally urging the plunger downwardly and into the cylinder. Each piston includes an enlarged head having a beveled surface 68 and an annular groove 70 therein adapted to receive the plunger and lock the piston as will appear hereinafter.

The cylinder includes a central shoulder 72 having an axial bore 74 intersecting the bore 17, the axial bore including two branch bores 76 and 78 parallel to bore 17 and leading to the interior of the cylinder.

In practical operation, the parts assume the position shown in Figure 1 when the brakes are not applied; when they are applied, fluid pressure passes from the master cylinder into the central interior portion 56 of the cylinder through the bores 17, 76 and 78 pushing the pistons apart and against action of the springs 52 and 54 thus applying equal pressure to the brake lines 34 and 36. While moving apart, a small amount of fluid is bypassed around the pistons through conduits 76, 78 and 62. This bypassing of the fluid is held to a minimum by the pistons covering the ports of conduits 76 and 78 as soon as they begin their outward movement. Plungers 60 are machined so they do not seat in bores 58 and stop the flow of fluid in either direction. When the pistons occupy their complete spread apart position, as shown in Figure 2, fluid pressure communication is shut off between the bores 17, 76, 78 and the conduits 62. However, should a leak occur in line 34, no back pressure is created against piston 38 so that it continues to move to the left of the figures, the plunger 60 riding on the beveled surface 68 until it snaps into annular groove 70, as shown in Figure 3, thus locking the piston 38 and cutting off fluid pressure communication with the leaky line 34 while the line 36 and consequent braking action is still in operation, so that the leaky line does not completely immobilize the hydraulic brake system.

This is important because, during normal operation, heat is generated in all brake systems and this heat is absorbed by the fluid in the wheel cylinders. This absorption of heat by the fluid causes it to expand and build up back pressure if some means is not provided to vent the fluid back into the master cylinder. This back pressure is relieved in the present unit when the brakes are released and the cylinder is in the position shown in Figure 1; the fluid bleeds back through the unit through conduits 62, 76, 78, 74, 17 and through line 20 to the master cylinder.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an automotive vehicle having a hydraulic brake system including a master cylinder and lines leading to the front and rear wheel brakes; a safety coupling connecting said master cylinder to said lines including a cylinder, apertured closures at the ends of said cylinder and secured to the front and rear wheel brake lines, means connecting the master cylinder centrally to said cylinder for communication with the interior of the latter, opposed pistons axially slidable in said cylinder, resilient means within said cylinder between said pistons and said closures normally urging said pistons toward each other, and means for locking each of said pistons in a position within said cylinder to prevent further delivery of hydraulic fluid to said brake lines when a leak occurs in said lines, said last-named means including radial bores through the wall of said cylinder, plungers slidable in said bores, adjustable resilient means normally urging said plungers into said cylinder and toward said pistons and means causing locking engagement between said plungers and said pistons after predetermined sliding movement of said pistons toward said closures, said means causing locking engagement of said plungers and said pistons including an enlarged shoulder on each piston having a beveled surface adapted to abut each of said plungers and raise the latter against action of said resilient means, and an annular groove in each of said shoulders adapted to lockingly receive each of said plungers.

2. The combination of claim 1 wherein said adjustable resilient means includes an adjusting nut threaded in each of said bores, and a coil spring interposed between said nut and each of said plungers.

DAVID L. WISE.
ARTHUR R. KING.

REFERENCES CITED

The following references are of record in the file of this patent:

UNITED STATES PATENTS

| Number | Name | Date |
|---|---|---|
| 1,664,680 | Hallett | Apr. 3, 1928 |
| 1,905,077 | Walker | Apr. 25, 1933 |
| 1,968,702 | Nall | July 31, 1934 |
| 2,093,015 | Madden | Sept. 14, 1937 |
| 2,128,853 | Roen | Aug. 30, 1938 |
| 2,195,214 | Jacob | Mar. 26, 1940 |
| 2,201,523 | Derrig | May 21, 1940 |
| 2,285,703 | Foster | June 9, 1942 |